April 21, 1953  O. J. BELL ET AL  2,635,491
PORTABLE PISTON KNURLING TOOL
Filed Oct. 5, 1949  2 SHEETS—SHEET 1

INVENTORS
ORLANDO J. BELL.
BY CLAYTON P. HARVEY.
William E. Schuyler Jr.
ATTORNEY April 21, 1953     O. J. BELL ET AL     2,635,491
PORTABLE PISTON KNURLING TOOL
Filed Oct. 5, 1949     2 SHEETS—SHEET 2
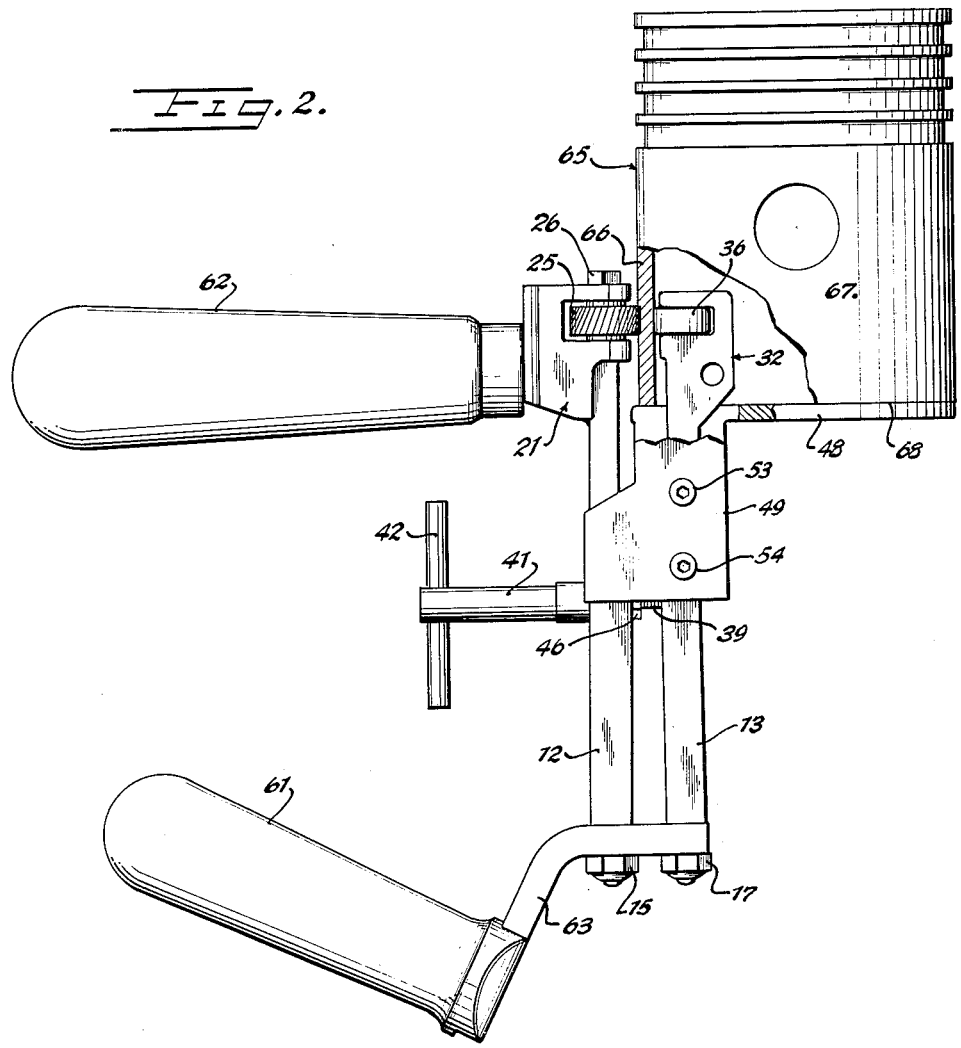
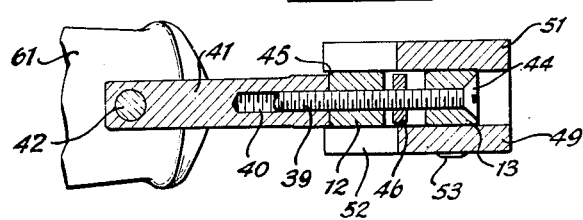
INVENTORS
ORLANDO J. BELL.
BY CLAYTON P. HARVEY.
ATTORNEY Patented Apr. 21, 1953

2,635,491

UNITED STATES PATENT OFFICE 2,635,491

PORTABLE PISTON KNURLING TOOL

Orlando J. Bell and Clayton P. Harvey,
Windsor, N. Y.

Application October 5, 1949, Serial No. 119,717

3 Claims. (Cl. 80—5.1)

This invention concerns a portable and manually operable device for knurling the outer surface of pistons such as those used in internal combustion engines.

When cylinders are reconditioned, their internal diameter is slightly increased as by reboring to remove scars on the cylinder wall. Pistons must be fitted with over size rings designed to fit the enlarged cylinder. In cases where the cylinder is considerably enlarged, it is necessary to use larger pistons. To provide satisfactory operation without replacing the piston, a technique has been developed of knurling the external surface of the piston skirt to effectively enlarge its diameter.

Heretofore, knurling of pistons has been performed by placing the piston in a lathe chuck to turn it, and then applying a knurling tool to the surface of the piston skirt. This machinery is expensive and alinement of the piston in the chuck requires considerable time.

A major object of this invention is to provide a simple, inexpensive, portable, manually operable piston knurling tool.

An important object of the invention is to provide a knurling tool which is guided by the piston and hence does not require the time consuming operation of centering the pistons in a chuck prior to the knurling operation.

In accomplishing these objects one important feature of the invention resides in the arrangement of a knurling wheel and a roller on a pair of rods between which the wall of a piston skirt may be inserted. Another feature of the invention resides in the provision of a shelf on one of the rods to engage the circular bottom edge of a piston skirt having its wall interposed between the knurling wheel and roller. Another important feature is the arrangement of a threaded, manually operable device for bending the two rods toward and away from each other to adjust the spacing between the knurling wheel and roller, and also to apply sufficient pressure to the knurling wheel to cause it to bite into a piston skirt wall interposed between the knurling wheel and roller.

Other objects and advantages of the invention will become apparent from the following specification taken in connection with the accompanying drawings wherein:

Fig. 2 is a similar view showing the knurling tool with the wall of a piston skirt interposed between the knurling wheel and roller, parts of the piston being broken away and shown in section;

Fig. 5 is a horizontal sectional view taken on the line 5—5 of Fig. 1.

Figure 1:
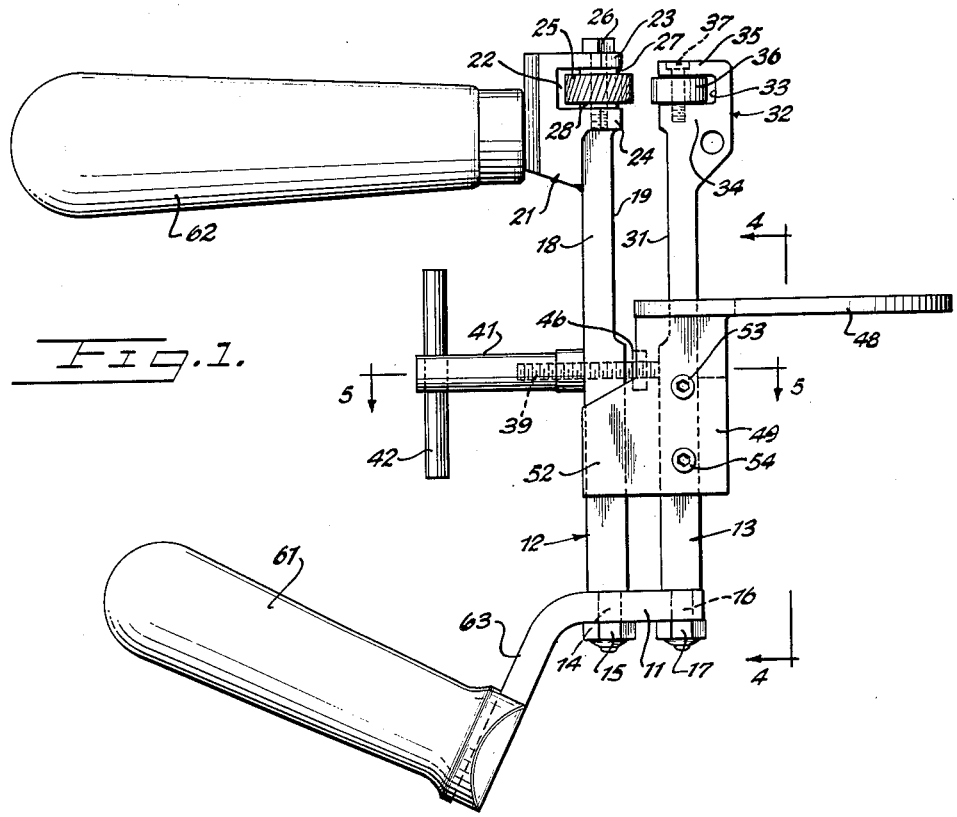
Figure 1 is a side elevation of a piston knurling tool embodying the invention in its preferred form.
Figures 3, 4:
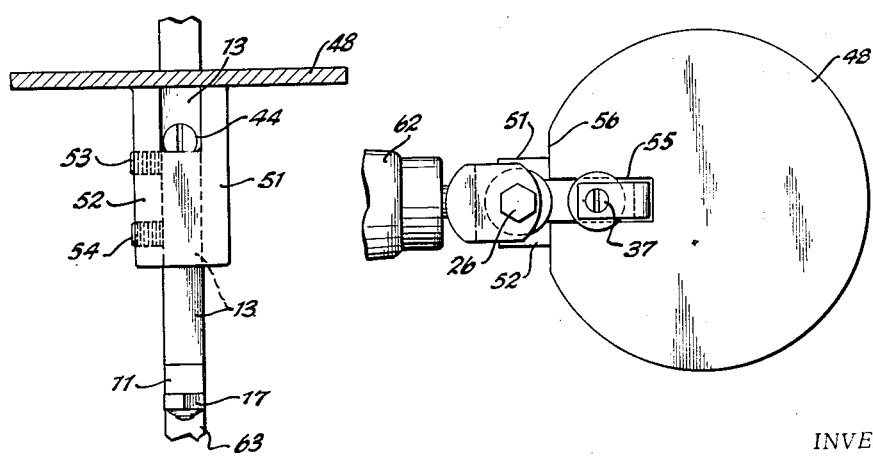
Fig. 3 is a top plan view of the piston knurling tool shown in Fig. 1.
Fig. 4 is a vertical sectional view taken on the line 4—4 of Fig. 1.

In accordance with the preferred form of the invention, a base member has fixed thereon a pair of rods extending in the same direction from the base member and spaced apart a distance slightly greater than the thickness of the wall of a piston skirt. Journaled in the unattached end of one rod is a knurling wheel, and similarly journaled in the other rod is a roller. A manually operable threaded device connects the two rods for bending them toward and away from each other to adjust the spacing between the knurling wheel and the roller. A shelf slides along the rod having a roller and may be secured thereto at any desired distance from the roller. This shelf extends transversely away from the rod having the knurling wheel so it will engage the circular bottom of a piston skirt inserted between the knurling wheel and the roller. One handle is attached to the base member, and a second handle is attached to the knurling wheel rod adjacent the wheel. Both handles extend transversely away from the rod having the roller journaled in its end.

Referring now to the embodiment of the invention illustrated in the drawings, the piston knurling tool is shown as having a base member 11 on which are mounted a first rod 12 and a second rod 13. Rod 12 has a lower end 14 of reduced diameter extending through a hole in the base member 11 and threaded to receive nut 15 and thereby rigidly attached the rod to the base member. Similarly, rod 13 has a lower end 16 of reduced diameter extending through a hole in the base member 11 and securely attached by a nut 17 on a threaded end of the rod. The first rod 12 is illustrated as having a rectangular cross-section and this has been found the preferred shape of the rod. Upper portion 18 of the first rod 12 has its face opposite the second rod 13 undercut, as indicated at 19. At the free end of the rod, a distance from the base member 11, there is attached, as by welding, a head 21 recessed at 22 transversely of the rod 12 to provide an arm 23 spaced longitudinally of the rod away from a cap 24 on the end of the rod. Journaled between the arm 23 and cap 24 is a conventional knurling wheel 25 supported to rotate about an axis extending longitudinally of the rod by a pin 26 extending through a hole in the arm 23 and threaded into a tapped hole in the cap 24. To provide a snug fit for the rotatable knurling wheel 25, spacers 27 and 28 may be arranged on opposite sides of the knurling wheel between the arm 23 and the cap 24. Rod 13 is shaped similarly to the first rod 12 and has a recess 31 opposite the recess 19. A head 32 may be welded on the free end of the second rod 13, which head is likewise recessed at 33 transversely of the rod 13 to provide a cap 34 on the end of the rod 13 and an arm 35 spaced longitudinally of the rod away from the cap 34.

A roller 36 is arranged in the recess 33 and journaled on a pin 37 extending through a hole in the arm 35 and threaded into a tapped hole in the cap 34 so the roller will rotate about an axis extending longitudinally of the second rod 13.

Both rods 12 and 13 are preferably formed of a high grade steel so they may be bent toward and away from each other without breaking. To so bend the rods, a bolt 39 extends through a transverse hole formed in the second rod 13 and a corresponding hole formed in the first rod 12. These holes are arranged intermediate the rods about midway between the base member 11 and the knurling wheel 25 and roller 36 journaled in the unattached ends of the rods. A nut, in the form of a cylindrical member 41, has a tapped hole 40 threaded onto the end of the bolt 39 projecting through the hole in the first rod 12. This cylindrical nut 41 is provided with a lateral handle 42 which may be turned to thread the nut onto the bolt 39 so the rods 12 and 13 will be compressed toward each other between head 44 on the bolt 39 and an abutment end 45 on the nut 41 engaging the side of the rod 12. The limit of this compression may be controlled by a floating nut 46 on the bolt 39 between the two rods.

The purpose of the manually operable threaded device, including bolt 39 and nut 41 is to bend the rods 12 and 13 toward each other to move the knurling wheel 25 toward the roller 36. To increase the space between the knurling wheel and the roller, the nut 41 may be turned in the opposite direction so the rods 12 and 13 will spring back to their original positions and thereby space themselves further apart.

Slidable along the second rod 13 is a shelf 48, preferably of circular shape, for engaging the lower end of a piston skirt having its side wall interposed between the knurling wheel 25 and the roller 36, as illustrated in Fig. 2. This shelf 48 is slidably mounted on the second rod 13 by a bracket 49 having bifurcated sides formed by portions 51 and 52 extending across opposite sides of the arms 12 and 13. The bracket 49 may be secured in any desired position along the rod 13 by bolts 53 and 54 threaded in tapped holes in the bracket portion 52 so they may be tightened against the side of the rod 13. While the shelf 48 is generally of circular shape, it is formed with a radially extending notch 55 to accommodate the rod 13 and has a portion of its periphery straightened along the wall 56 of the circle so the circular shelf will not interfere with the rod 12.

Manipulation of the knurling tool is accomplished by a pair of handles 61 and 62. The first handle 61 is attached to an arm 63 on the base member 11 and extending at an angle from the base member in a direction away from the rods 12 and 13 so the handle 61 is disposed at an oblique angle with respect to the longitudinal axes of the rods. The second handle 62 is attached to head 21 on the unattached end of the rod 12 adjacent the knurling wheel 25 and extends transversely of the rod 12 in a direction away from the second rod 13.

In operation, the rods 12 and 13 are opened by relieving the screw 41 on the bolt 39. A piston, such as the piston 65, shown in Fig. 2, is held in a vice and has a side wall 66 of its skirt 67 inserted between knurling wheel 25 and roller 36 to the point where the outer surface 66 is to be knurled. Then, shelf 48 is moved along the second rod 13 toward the roller 36 until it engages the circular bottom 68 of the piston skirt 67. Then, bolts 53 and 54 are tightened to lock the shelf bracket 49 and the shelf 48 at the desired distance from the roller 36. Then, the handle 42 on the nut 41 is turned to tighten the nut on the bolt 39 so the knurling wheel 25 is embedded in the outer surface of the piston skirt 67. The depth to which the knurling wheel bites into the surface of the piston skirt may be controlled by adjustment of nut 46. An operator may grasp handles 61 and 62 to move the entire knurling tool about the axis of the piston thereby rolling the knurling wheel 25 around the circumference of the skirt to raise knurls on the face of the skirt and thereby enlarge the diameter of the piston.

Once the shelf 48 has been set and locked a desired distance from the roller 36 and once the nut 46 has been adjusted for the proposed depth of cut, the knurling tool may be quickly applied to successive pistons merely by placing the shelf 48 against the circular bottom of the piston skirt with the skirt wall 56 interposed between the knurling wheel and the roller, and then tightening the handle 42 until the inner surface of the first rod 12 engages the nut 46. After the knurling tool has been turned about the circumference of the piston, which operation is completed in a very short time, the handle 42 may be turned to relieve the nut 41, so the rods, together with the knurling wheel and roller, will move away from each other, the piston removed, and a new piston inserted.

As will be apparent, the piston knurling tool of the present invention is a simple, inexpensive device which will accomplish in a shorter time the knurling operations heretofore performed only by complex machines.

What is claimed is:

1. A portable piston knurling tool comprising a base member, a pair of spaced rods mounted on said base member and extending in the same direction therefrom, a knurling wheel journaled in one rod at a distance from said base member for rotation about an axis extending longitudinally of said one rod, a roller journaled in the other rod opposite said wheel for rotation about an axis extending longitudinally of said other rod, means interconnecting said rods for bending them toward and away from each other to adjust the spacing between said wheel and said roller, a handle attached to said one rod adjacent said wheel and extending in a transverse direction away from said other rod, and a shelf on said other rod extending transversely in a direction away from said one rod, said shelf being arranged to engage the circular bottom of a piston skirt having its side wall interposed between said wheel and said roller in a manner to guide said wheel and roller in an annular path uniformly spaced from the bottom of the piston skirt.

2. A portable piston knurling tool comprising a base member, a pair of spaced rods mounted on said base member and extending in the same direction therefrom, a knurling wheel journaled in one rod at a distance from said base member for rotation about an axis extending longitudinally of said one rod, a roller journaled in the other rod opposite said wheel for rotation about an axis extending longitudinally of said other rod, means interconnecting said rods for bending them toward and away from each other to adjust the spacing between said wheel and said roller, a first handle attached to said base, a second handle attached to said one rod adjacent said wheel, both of said handles extending in a transverse direction away from said other rod, and a shelf on said other rod extending transversely in a direction away from said one rod, said shelf being arranged to engage the circular bottom of a piston skirt having its side wall interposed between said wheel and said roller in a manner to guide said wheel and roller in an annular path uniformly spaced from the bottom of the piston skirt.

3. A portable piston knurling tool comprising a base member, a pair of spaced rods mounted on said base member and extending in the same direction therefrom, a knurling wheel journaled in one rod at a distance from said base member for rotation about an axis extending longitudinally of said one rod, a roller journaled in the other rod opposite said wheel for rotation about an axis extending longitudinally of said other rod, means interconnecting said rods for bending them toward and away from each other to adjust the spacing between said wheel and said roller, a shelf slidably mounted on said other rod for movement between said base and said roller and extending transversely in a direction away from said one rod, said shelf being arranged to engage the circular bottom of a piston skirt having its side wall interposed between said wheel and said roller in a manner to guide said wheel and roller in an annular path uniformly spaced from the bottom of the piston skirt, and means for securing said shelf on said other rod at selected distances from said rollers.

ORLANDO J. BELL.
CLAYTON P. HARVEY.

References Cited in the file of this patent

UNITED STATES PATENTS

| Number | Name | Date |
|---|---|---|
| 308,686 | Merrill | Dec. 2, 1884 |
| 412,122 | Rowland | Oct. 1, 1889 |
| 768,771 | Riegner | Aug. 30, 1904 |
| 2,153,863 | Fall | Apr. 11, 1939 |
| 2,289,941 | Switzer | July 14, 1942 |